CURRENT MONITORING CIRCUITS

Filed Aug. 26, 1963 2 Sheets-Sheet 1

Inventors
G.G. PULLUM R.B. ANDREWS
By [signature] Attorney

CURRENT MONITORING CIRCUITS

Filed Aug. 26, 1963 2 Sheets-Sheet 2

Inventors
G.G. PULLUM R.B. ANDREWS
By [signature]
Attorney

United States Patent Office 3,359,379

Patented Dec. 19, 1967

3,359,379

CURRENT MONITORING CIRCUITS

Geoffrey George Pullum and Richard Brough Andrews, London, England, assignors to International Standard Electric Corporation, New York, N.Y., a corporation of Delaware Filed Aug. 26, 1963, Ser. No. 304,393
Claims priority, application Great Britain, Aug. 24, 1962, 32,643/62
13 Claims. (Cl. 179—175.2)

ABSTRACT OF THE DISCLOSURE

A circuit monitors a TDM highway to detect the presence of a signal and to distinguish between the appearance of speech and periods of silence. This is done by inserting an impedance in the highway conductor and coupling a transistor's emitter-base across it. Since the impedance is always present and does little except change existing and essential impedance slightly, the monitor circuit does not produce any appreciable effect upon line current. The gain from the transistor should approximately offset any loss from the impedance.

This invention relates to electrical supervisory circuits, and particularly, but not exclusively to such circuits for use in monitoring the conditions of current flow in a circuit carrying communication signals.

In communication circuits it is necessary in many cases to be able to monitor the current flow without interfering therewith: this is particularly so in the case of a time division multiplex telephone exchange, although the requirement exists elsewhere. An object of the invention therefore is to provide a circuit for monitoring the conditions of current flow in a monitored circuit without undue interference therewith.

According to the present invention there is provided an electrical circuit for monitoring the current in a supervised circuit, which comprises an impedance in said supervised circuit through which the current to be monitored flows, and an amplifier having its input connected across said impedance, so that current flowing in said impedance develops at the input of said amplifier a voltage which causes said amplifier to produce an output current whose characteristics are closely determined by the current in said impedance, and hence by the current in said supervised circuit.

According to the present invention there is also provided an electrical circuit for monitoring the current in a supervised circuit, which comprises a resistive impedance in said supervised circuit through which the current to be monitored flows, a transistor in the base-emitter circuit of which said resistive impedance is connected, so that current flowing in said impedance develops at the emitter of said transistor a voltage which causes the transistor to produce at its collector an output current whose characteristics are closely determined by the current in said impedance, and hence by the current in said supervised circuit.

According to the present invention there is further provided an electrical circuit for monitoring the current flowing in the highway of a time-division multiplex telecommunication system, which comprises a first resistive impedance included in said highway so that the current in said highway flows therein, and a transistor having its base connected to one end of said first resistive impedance and its emitter connected via a second resistive impedance to the other end of said first resistive impedance, so that current flowing in said first resistive impedance develops at the emitter of said transistor a voltage proportional to the current in said highway which causes the transistor to produce at its collector an output current whose value is closely determined by the current in said highway.

Embodiments of the invention will now be described with reference to the accompanying drawings, in which, FIG. 1 shows a circuit for monitoring current flow in a time division multiplex highway, using a PNP transistor.

Figure 3:
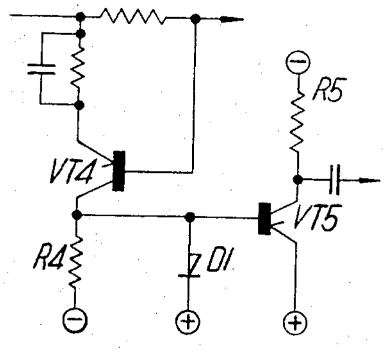
FIG. 3 shows a circuit similar to that of FIG. 1, but with a threshold circuit added.
Figure 3A:
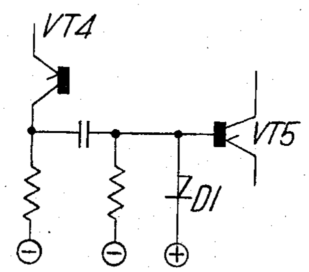

FIG. 3*a* is a modification of FIG. 3.

Figure 4:
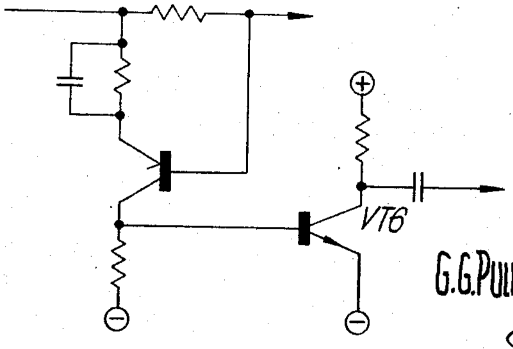

FIG. 4 is a circuit similar to that of FIG. 3, but where the threshold detector uses an NPN transistor.

Figure 5:
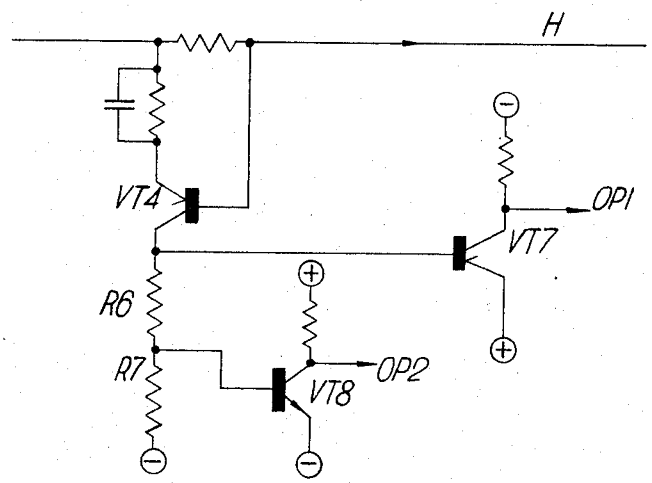

FIG. 5 is a circuit similar to FIG. 3, but in which there are two threshold detectors.

Figure 6:
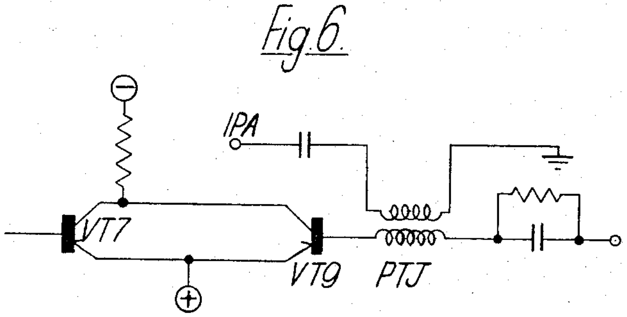

FIG. 6 shows a modification applicable to any of the circuits using threshold detectors by which the threshold detector is normally disabled, being enabled as and when required.

Figure 7:
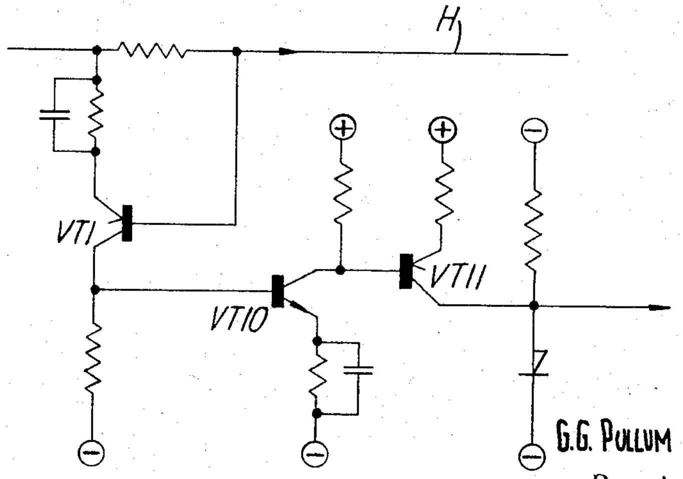

FIG. 7 is a circuit generally similar to that of FIG. 1, but with an amplifying arrangement added for a purpose to be explained later.

The various circuits described in detail herein have been developed for use an ancillary circuitry for use in an automatic telephone exchange in which speech is conveyed by time division multiplex signals, although the circuits have other applications.

Figure 1:
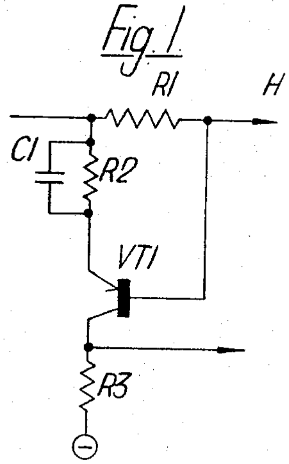

In FIG. 1, H represents a time division multiplex signal path, generally known as a highway, of an automatic telephone exchange. Included in the highway, and hence in the circuit which carries the highway signals, is a resistor R1. The resistor is connected via and RC circuit, R2 and C1, to the emitter of a PNP transistor VT1 whose base is connected directly to the highway H. Thus a proportion of the current on the highway H is tapped off and is applied to the emitter of VT1. This proportion is determined by the choice of R1 and R2, and is a small fraction of the highway current. The circuit is so intended as to satisfy, as closely as possible, three conditions. The first condition is that the proportion tapped off should increase or decrease the highway current as little as possible, while the second is that it should give an output only when communication current is flowing in the highway, i.e. spurious voltages on the highway should not have any marked effect on the output of VT1. The third condition is that the output current in the collector resistor R3 should be closely proportional to the highway current.

The third condition can never be absolutely satisfied owing to the presence of a small, non-linear (with current) voltage drop between the emitter and base of VT1. However the condition can be approximated to by making the voltage drop in R1 large in comparison with the emitter-base voltage drop mentioned above. This is done by suitable choice of R1 and R2. Capacitor C is added to compensate for the slow "build-up" of the current gain of VT1 but it may be possible to omit it entirely if the transistor VT1 is sufficiently fast in operation. A final condition which has to be met is that VT1 should not saturate.

Figure 2:
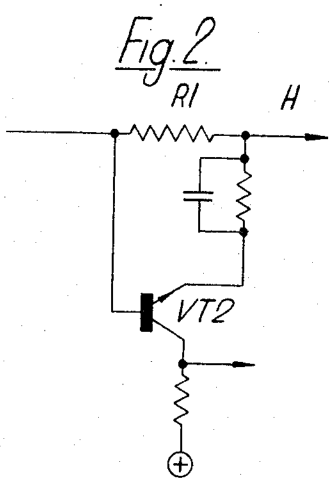
FIG. 2 is a circuit generally similar to FIG. 1, but using an NPN transistor.

The arrangement of FIG. 2 is identical to that of FIG. 1 with the exception that transistor VT2 is an NPN transistor. The only changes are that all voltages are reversed in polarity and that the connections of the emitter and base to the ends of the resistor R1 are reversed as compared with FIG. 1. In both FIGS. 1 and 2, an arrow head on the highway indicates the direction of signal flow along the highway.

One interesting consequence of the manner of operation of PNP and NPN transistors is that the highway can be tapped for supervision at several points without substantially affecting the magnitude of the current in the highway H. This is done by using circuits such as FIGS. 1 and 2 alternately. Thus the PNP transistor circuit in effect taps off a small proportion of the highway current, while the NPN transistor in effect, causes current to be added to the highway. A further consequence of the above is that a tap using an NPN transistor can be used to give the output needed for supervision and also to amplify the current flowing in the highway. This phenomenon whereby the use of an NPN transistor as a tap in effect amplifies the current being supervised does not, of course, amount to obtaining of "something for nothing" because the power which produces the amplification comes from the amplifier supply source.

The collector output in either FIG. 1 or FIG. 2 is applied via suitable amplification to either a cathode ray oscilloscope or a measuring instrument for visual monitoring, and/or to a telephone instrument for audible monitoring.

Circuits such as those described above can be used in conjunction with threshold circuits. Thus in FIG. 3, the collector output of the PNP transistor VT4 arranged as shown in FIG. 1 is connected to the base of a further transistor VT5, which is connected in the common emitter configuration. A semiconductor silicon diode D1 is connected between the collector of VT4 and the positive supply, this clamps the collector voltage of VT4 so that the latter is unable to saturate when VT5 is turned off.

The additional transistor VT5 is conducting in the absence of current in the highway, being normally saturated in this case. When current flow in the highway reaches a certain value, the voltage developed across R4, the collector resistor of VT4, causes VT5 to be cut off. The value at which this occurs depends on the parameters of the circuit and especially on the base current bias of VT5. The output pulse produced across R5, the collector resistor of VT5, has an amplitude which is equal to the voltage across R5 when VT5 was conducting.

In this circuit the D.C. coupling between VT4 and VT5 can be replaced by an A.C. coupling as shown in the simplified FIG. 3(*a*).

The circuit of FIG. 4 differs from that of FIG. 3 only in that the threshold detector is an NPN transistor VT6. Owing to the conduction state of the base emitter junction of VT6, the diode D1 needed in FIG. 3 to clamp the collector of VT4 is no longer needed. In this case the transistor VT6 is normally cut off, and conducts and clamps when the transistor saturates the collector voltage of VT4 only if highway current in excess of the preselected threshold flows.

The circuit shown in FIG. 5 has two threshold detectors which respond to different levels of current in the highway H. One application of this would be to detect whether or not speech is present in a telephone circuit. Thus in such a case when a connection is set up but the two interconnected subscribers are simultaneously silent, the pulses of the time division channel in use for that connection have a low amplitude whereas they have a larger amplitude when speech is actually present. A double threshold circuit such as that of FIG. 5 will enable these two conditions to be recognised.

With the circuit shown in FIG. 5, the output voltage OP1 from transistor VT7 appears whenever the current on the highway is equal to or greater than a first threshold $I_1$ milliamps, while the output voltage OP2 from transistor VT8 appears whenever the highway current is equal to or greater than a second threshold $I_2$ milliamps, the value of $I_2$ being greater than that of $I_1$. Note that VT7 is a PNP transistor while VT8 is an NPN transistor.

It will be seen that by suitable choice of the resistors R6 and R7 and of the biasses of the two transistors VT7 and VT8, the thresholds can be adjusted independently of each other. Furthermore, by using threshold circuits in this way, the output pulse amplitudes can be adjusted to desired values without affecting the current in the highway.

The circuit of FIG. 6 shows an addition which can be made to a threshold circuit so that it is normally disabled but can be enabled when required. This includes a further transistor VT9 whose emitter-collector path is connected across the emitter-collector path of VT7, the threshold transistor. This transistor VT9 is normally saturated, in which condition it short-circuits VT7. When an output is required, a so-called inspection pulse of negative polarity is applied to input IPA: such a pulse, via a pulse transformer PT1 which inverts it, cuts VT9 off, which enables VT7 for the duration of the inspection pulse. One application of this arrangement in an automatic telephone exchange would be as a test circuit for determining whether a certain channel or channels of the multiplex is or are busy. To make such a test the negative pulse on IPA is made to coincide with the time position corresponding to the channel being checked.

FIG. 7 shows a simple highway tap circuit such as that of FIG. 1, with a two stage amplifying circuit using an NPN transistor VT10 and a PNP transistor VT11. The circuit amplifies the tapped-off fraction of the highway current so that it has a level which can be made equal to that of the highway current itself. That is, the output current waveform from VT11 can if desired be almost an exact replica of that of the highway current. Thus any variation in the amplitude of the highway current above a minimum current level (determined by the parameters of the circuit), is copied in amplitude by the output current. This minimum current level is that needed to just turn the transistor VT10 on.

If the collector of the transistor VT1 is connected to a voltage which is a volt or two less negative than the voltage to which the emitter of VT10 is connected, then the latter is normally conducting and any change in highway current is immediately copied.

What we claim is:

1. An electrical circuit for monitoring the current in a supervised circuit, which comprises a resistive impedance in said supervised circuit through which the current to be monitored flows, a transistor in the base-emitter circuit of which said resistive impedance is connected, so that current flowing in said impedance develops at the emitter of said transistor a voltage which causes the transistor to produce at its collector an output current whose characteristics are closely determined by the current in said impedance, and hence by the current in said supervised circuit, and threshold detector means connected to the collector of said transistor and operated responsive to the current applied thereto reaching a given value.

2. An electrical circuit for monitoring the current in a supervised circuit, which comprises a resistive impedance in said supervised circuit through which the current to be monitored flows, a transistor in the base-emitter circuit of which said resistive impedance is connected, so that current flowing in said impedance develops at the emitter of said transistor a voltage which causes the transistor to produce at its collector an output current whose characteristics are closely determined by the current in said impedance, and hence by the current in said supervised circuit, the collector load of said transistor is split into two portions, and which comprise two threshold detector means, one of said means being connected directly to the collector of said transistor and the other of said means being connected to the split between said two portions, and means whereby said threshold detector means respond at different levels.

3. An electrical circuit for monitoring the current in a supervised circuit, which comprises a resistive impedance in said supervised circuit through which the current to be monitored flows, a transistor in the base-emitter circuit of which said resistive impedance is connected, so that current flowing in said impedance develops at the emitter of said transistor a voltage which causes the transistor to produce at its collector an output current whose characteristics are closely determined by the current in said impedance, and hence by the current in said supervised circuit, in which said transistor connected to the resistive impedance in the supervised circuit is a PNP transistor.

4. An electrical circuit for monitoring the current in a supervised circuit, which comprises a resistive impedance in said supervised circuit through which the current to be monitored flows, a transistor in the base-emitter circuit of which said resistive impedance is connected, so that current flowing in said impedance develops at the emitter of said transistor a voltage which causes the transistor to produce at its collector an output current whose characteristics are closely determined by the current in said impedance, and hence by the current in said supervised circuit, in which the transistor connected to the resistive impedance is an NPN transistor.

5. The invention of claim 4 wherein there are a plurality of the circuits as claimed in claim 4, a system having a plurality of positions, an arrangement for monitoring the current at successive ones of said positions in a supervised circuit, which comprises a circuit as claimed in claim 4 at each said position, each successive ones of said positions being provided with circuits utilizing PNP and NPN transistors alternately.

6. An electrical circuit for monitoring the current flowing in the highway of a time-division multiplex telecommunication system, which comprises a first resistive impedance included in said highway so that the current in said highway flows therein, and a transistor having its base connected to one end of said first resistive impedance and its emitter connected via a second resistive impedance to the other end of said first resistive impedance, so that current flowing in said first resistive impedance develops at the emitter of said transistor a voltage proportional to the current in said highway, which causes the transistor to produce at its collector an output current whose value is closely determined by the current in said highway.

7. An electrical circuit as claimed in claim 6, and which comprises a threshold detector connected to the collector of said transistor, which detector responds when the current in said highway rises above a certain value.

8. An electrical circuit for monitoring the current flowing in the highway of a time-division multiplex telecommunication system, which comprises a first resistive impedance included in said highway so that the current in said highway flows therein, and a transistor having its base connected to one end of said first resistive impedance and its emitter connected via a second resistive impedance to the other end of said first resistive impedance, so that current flowing in said first resistive impedance develops at the emitter of said transistor a voltage proportional to the current in said highway, which causes the transistor to produce at its collector an output current whose value is closely determined by the current in said highway, in which the collector of said transistor is connected to the supply source via two resistors in series, and in which a first threshold detector is connected to the junction between one of said resistors and the collector while a second threshold detector is connected to the junction between said two resistors, said detectors responding at different current levels.

9. An electrical circuit as claimed in claim 7 and in which said threshold detector means uses a transistor.

10. An electrical circuit as claimed in claim 7 and in which said threshold detector means is normally disabled, means for enabling said detector means at the time position appropriate to one of the channels of said multiplex.

11. An electrical circuit as claimed in claim 10 and in which said disabling and enabling means is effected by a further transistor for said threshold detector transistor, said further transistor having its emitter-collector path across the emitter collector path of said threshold detector transistor and in which said further transistor is normally saturated, but is cut off when its threshold detector is to be enabled.

12. An electrical circuit as claimed in claim 6 and means which comprises a transistor amplifier whose input is fed from the collector of said first mentioned transistor, the amplification afforded by said transistor being such that it provides an output of substantially the same amplitude as said supervised highway current.

13. The invention of claim 6 and a system comprising a plurality of points along said highway, an electrical arrangement for monitoring the current at each of said successive points along the highway of said time-division multiplex system, a circuit as claimed in claim 6 at each said point, alternate ones of said circuits using PNP transistors and NPN transistors.

References Cited

UNITED STATES PATENTS

| | | | |
|---|---|---|---|
| 2,846,526 | 8/1958 | Moore et al. | 179—175.2 |
| 3,235,676 | 2/1966 | Jacob | 179—15 |

KATHLEEN H. CLAFFY, *Primary Examiner.*

R. MURRAY, A. McGILL, *Assistant Examiners.*